United States Patent
Ryan

Patent Number: 5,916,315
Date of Patent: Jun. 29, 1999

[54] VITERBI DETECTOR FOR CLASS II PARTIAL RESPONSE EQUALIZED MILLER-SQUARED SIGNALS

[75] Inventor: William E. Ryan, Las Cruces, N.M.

[73] Assignee: Ampex Systems Corporation, Redwood City, Calif.

[21] Appl. No.: 08/781,469

[22] Filed: Jan. 10, 1997

Related U.S. Application Data

[63] Continuation-in-part of application No. 08/294,579, Aug. 23, 1994, abandoned.

[51] Int. Cl.⁶ ............................................. G06F 11/10
[52] U.S. Cl. .................. 714/786; 714/7; 714/792; 714/793
[58] Field of Search ................. 371/43.1, 45, 43.4; 375/230, 290, 348, 341, 263, 340, 233

[56] References Cited

U.S. PATENT DOCUMENTS

| Re. 31,311 | 7/1983 | Miller | 360/40 |
|---|---|---|---|
| 3,647,964 | 3/1972 | Tang | 178/68 |
| 3,775,759 | 11/1973 | Armitage, Jr. et al. | 340/174.1 |
| 4,027,335 | 5/1977 | Miller | 360/40 |
| 4,571,734 | 2/1986 | Dolivo et al. | 375/18 |
| 4,644,564 | 2/1987 | Dolivo et al. | 375/18 |
| 4,646,305 | 2/1987 | Tretter et al. | 371/43 |
| 4,788,694 | 11/1988 | Calderbank | 375/59 |
| 4,888,775 | 12/1989 | Karabed et al. | 371/37.4 |
| 4,888,779 | 12/1989 | Karabed et al. | 371/43.4 |
| 4,890,299 | 12/1989 | Dolivo et al. | 375/18 |
| 5,040,191 | 8/1991 | Forney, Jr. et al. | 375/39 |
| 5,280,489 | 1/1994 | Fredrickson et al. | 371/45 |

FOREIGN PATENT DOCUMENTS

| 2238693 | 6/1991 | United Kingdom . |
|---|---|---|

OTHER PUBLICATIONS

Clark, Jr., et al., "Error–Correction Coding for Digital Communications", Plenum Press, Mar. 1988, pp. 253–262.

Wicker, S.B., "Error Control Systems For Digital Communication and Storage", Prentice Hall, 1995, pp. 314–322.

Wood, R., "New Detector For 1,k Codes Equalized to Class II Partial Response", IEEE Transactions on Magnetics, vol. 25, Sep. 1989, pp. 4075–4077.

*Primary Examiner*—Paul P. Gordon
*Assistant Examiner*—McDieunel L. Marc
*Attorney, Agent, or Firm*—Cesari and McKenna, LLP

[57] ABSTRACT

A novel circuit arrangement decodes Miller-squared ($M^2$) encoded signals using Class II partial response (PR2) equalization techniques. The circuit arrangement utilizes a maximum-likelihood sequence estimator (detector) implemented by the Viterbi algorithm to minimize the probability of bit errors in a digital storage or transmission channel that employs $M^2$ encoding in combination with PR2 equalization. The PR2 equalization channel is preferably modeled by a finite impulse response (FIR) filter which, in turn, is modeled by a finite-state trellis diagram. This allows creation of a modified trellis when $M^2$ encoding is applied to the PR2 channel with the modified trellis providing the basis for implementing the detector according to the invention.

13 Claims, 10 Drawing Sheets

VITERBI DETECTOR FOR CLASS II PARTIAL RESPONSE EQUALIZED MILLER-SQUARED SIGNALS

This is a continuation-in-part of U.S. Ser. No. 08/294,579, filed on Aug. 23, 1994, now abandoned.

FIELD OF THE INVENTION

This invention relates generally to error detection systems, and more particularly to maximum-likelihood sequence detection of modulation coded signals for systems having high-data rates.

BACKGROUND OF THE INVENTION

High-quality digital telecommunications and magnetic recording systems require channels capable of reliably supporting high-data rates. For example, transmission rates for high-definition television signals may range from 150 megabits per second (Mb/s) to more than 1,000 Mb/s, while some digital video applications require high-density, magnetic recording at rates in excess of 200 Mb/s.

These information channels typically have no response at zero frequency, i.e., they do not transmit at DC. A known data modulation code that may be utilized in connection with such channels is the Miller-squared code disclosed in Miller, U.S. Pat. No. 4,027,335 issued May 31, 1977 (Reissued on Jul. 12, 1983 in U.S. Pat. No. Re. 31,311) for DC Free Encoding For Data Transmission System. The Miller-squared ($M^2$) code is a self-clocking, rate ½ (two code bits per data bit) DC-free code which has a (1,5) runlength constraint. The (1,5) constraint implies that the minimum runlength of "0" and "1" bits in a $M^2$ code stream is two $M^2$ clock cycles long and the maximum runlength is six clock cycles in length.

High density recording may result in closely-situated flux transitions overlapping and producing interference, i.e., intersymbol interference (ISI), between the symbols they represent. Typically, ISI may also arise because of insufficient bandwidth at head-medium channels (for recording applications) and transmission channels (for telecommunication applications). The frequency response characteristics of these channels determine how closely the changes of input signal levels may be spaced for zero ISI. For high data rate channels, the bandwidth of the $M^2$ signal typically exceeds the bandwidth of these information channels.

Partial response signaling provides efficient utilization of the bandwidth of a given channel along with increased handling of ISI. That is, partial response signaling allows ISI among neighboring symbols, but in a controlled manner. When the ISI characteristic is controlled to some prescribed form, it may be anticipated in the channel design. An appropriate equalizing technique for $M^2$ coded signals on a bandlimited channel is a raised-cosine equalizer which is equivalent to Class II partial response (PR2) signaling since its discrete-time impulse response is exactly the PR2 channel model. The PR2 channel model is typically represented by the following polynomial:

$$0.5+D+0.5D^2=0.5(1+D)^2$$

Performance of high-data rate channels may be increased through use of partial response signaling in a data storage or transmission channel using a data detector configured to implement a Viterbi algorithm during data retrieval or reception. The Viterbi algorthim provides an iterative method for optimally estimating, in a maximum-likelihood sense, sequences of code symbols produced by a finite state machine acting upon a finite input set that is contaminated by noise. Viterbi detectors operate to process the code symbol sequences in accordance with the algorithm. The algorithm exploits the fact that the only allowable sequences are those which correspond to paths through a finite-state trellis diagram, which represents the transitions of channel states with the passage of time.

Generally, the path representing a transition between two states (nodes) adjacent in time is known as a branch and the associated branch metric is an indication of the likelihood of that particular transition occurring. A cumulative path metric is the sum of the branch metrics for a particular path to the left of a node under consideration. The overall path, i.e., the path between the beginning and the end of the trellis having the maximum path metric, is the maximum likelihood path and this latter path represents the best estimate of the code symbols actually transmitted.

In the context of Viterbi detection, the detector selects the path having the smallest (or alternately, the largest) cumulative path metric, i.e., the survivor path, for each node and all cumulative paths other than the survivor path are discarded. At each stage of the trellis it is not known which node the optimal path must pass through and so it is necessary to retain one survivor path for each node. The survivor path and associated path metric are stored in a memory for each node at a stage representing a particular time in order for the algorithm to proceed to the next stage at the next time increment.

When the terminal node of the trellis has been reached it is possible to determine the unique path of maximum likelihood representing the estimation of the code symbols actually transmitted. It is at this stage that the estimated symbols are read to effect a "trace-back" along the identified maximum likelihood path. In practice, however, it is not necessary to wait until the terminal node has been s reached before data decisions are made.

An example of a known detector that approaches maximum-likelihood performance for runlength limited codes on a PR2 channel is set forth in an article titled, *New detector for 1,k codes equalized to Class II partial response,* by Roger Wood, IEEE Transactions on Magnetics, vol. 25, September 1989. The detector is a "modified linear canceller" that passes an incoming signal through a matched filter and cancels the effects of ISI by using decisions from a preliminary, threshold detector. In this article, Wood suggests use of a maximum-likelihood (Viterbi) detector to achieve desirable circuit performance but does not develop this approach because of the complexity of implementing the Viterbi algorithm. The use of a threshold detector and linear canceller for such equalization, although simple and covenient, is nevertheless sub-optimal and the present invention is directed to providing an efficient Viterbi detector for optimizing maximum-likelihood detection of PR2-equalized $M^2$ signals.

SUMMARY OF THE INVENTION

The invention resides in a novel method and arrangement for decoding Miller-squared ($M^2$) encoded signals using Class II partial response (PR2) equalization. Specifically, the invention utilizes a maximum-likelihood sequence estimator implemented by the Viterbi algorithm, i.e., a Viterbi detector, to minimize the probability of sequence errors in a digital storage or transmission channel that employs $M^2$ encoding in combination with PR2 equalization. The PR2 equalization channel is preferably modeled by a finite impulse response (FIR) filter, e.g., a state-machine, which, in turn, is modeled by a finite-state trellis diagram. This allows creation of a modified trellis when $M^2$ encoding is applied to the PR2 channel. As described herein, this modified trellis provides the basis for implementing the Viterbi detector according to the invention.

Broadly stated, multi-level, $M^2$ coded PR2 signals are transmitted from a source through the storage or transmission channel where, after contamination by noise, they are received by the Viterbi detector and processed for estimating the maximum-likelihood output sequence of those signals. The Viterbi detector preferably comprises a plurality of circuit stages that are synchronously clocked to control the operations of the circuits within each stage. A branch metric calculation stage computes "branch metrics", i.e., the distance between trellis branch nodes and a current code sample, upon reception of the next code sample. These branch metrics are used to update cumulative metrics of current trellis path "survivors" in an add-compare-select stage, which stage also chooses new survivor metrics (paths) in accordance with the updated cumulative metrics. Thereafter, these new surviving trellis paths are stored in a trace-back memory stage and a current estimated decision is provided at the outputs of the detector.

In accordance with the invention, the combination of $M^2$ encoded signals equalized with PR2 signaling provides a uniquely conditioned set of signals upon which maximum-likelihood detection and estimation may be efficiently realized using the novel synchronized circuit arrangement described herein. Advantageously, the innovative Viterbi detector configuration of the invention improves the random error rate of received PR2-equalized $M^2$ signals by approximately two orders of magnitude relative to known threshold detectors.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
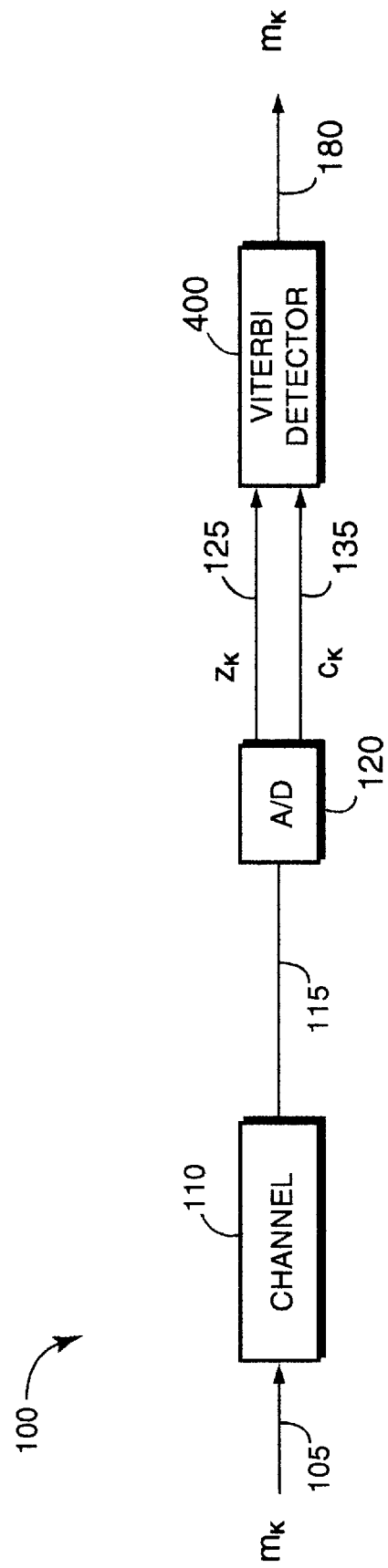
FIG. 1 is a schematic diagram of a system in which the novel circuit arrangement of the present invention may be advantageously applied.

FIG. 1 is a schematic diagram of a system 100 in which the novel circuit arrangement of the present invention may be advantageously applied. A sequence of binary code signals having values $m_k = \pm 1$ on line 105 is transmitted from a source at a rate of 160 MHz through a limited-bandwidth channel 110 coupled to an analog-to-digital (A/D) converter 120 via line 115 and onto a Viterbi detector circuit 400, which processes the code signals to determine a maximum-likelihood output sequence of those signals on line 180. The channel 110 is typically a transmission or magnetic recording channel having no response at zero frequency; accordingly, the binary code signals $m_k$ passing through the channel are preferably self-clocking DC-free, Miller-squared ($M^2$) coded signals. An appropriate equalizer for these coded signals on such a limited bandwidth channel is a raised-cosine equalizer, which conveniently lends itself to Class II partial response (PR2) signaling.

In general, a $M^2$ signal may be obtained by encoding a non-return-to-zero (NRZ) signal with a conventional $M^2$ encoder. The $M^2$ code has a (1,5) runlength constraint that defines a minimum runlength of "0" and "1" code stream bits of two $M^2$ clock cycles in length and a maximum runlength of bits of six clock cycles. In addition, $M^2$ encoding utilizes two code bits per data bit, so if T represents the time between data bits, the time between code bits is T/2. These code bits $m_k$ are transmitted as a binary waveform through the channel 110 equalized to a PR2 transfer function at discrete time instants $t=kT/2$, where k is the code bit interval, and self-clocking signals $y_k$ emanate from the channel 110 on line 115.

These output signals $y_k$ are fed to the A/D converter 120, which converts the analog waveform to digital signals $z_k$ on lines 125. In the illustrative embodiment, the digitized signals $z_k$ comprise a stream of 6-bit data samples, each yielding a total of 64 quantization levels. The A/D converter 120 also processes the self-clocking channel signals to extract clock signals $c_k$ for controlling circuit operations of the Viterbi detector. Preferably, the converter 120 supplies 160 MHz clock pulses $c_k$ on lines 135 to the detector 400 to provide a synchronous timing arrangment in accordance with the invention.

Figure 2:
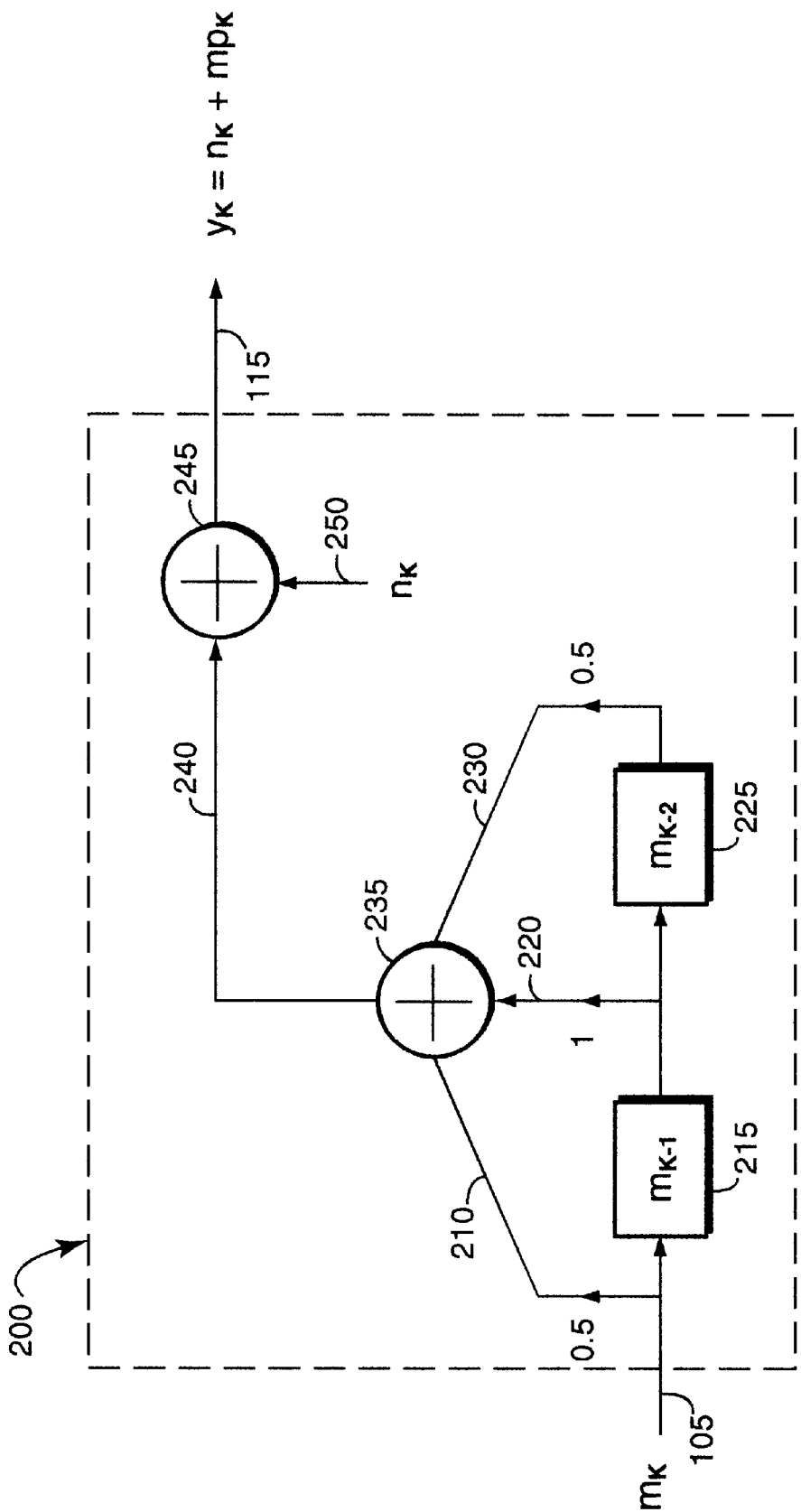
FIG. 2 is a schematized diagram of a finite impulse response filter used to model a channel of the system of FIG. 1.

The PR2 channel filter may be modeled by a finite impulse response (FIR) filter 200 shown in FIG. 2. This tapped-delay line filter combines three weighted, $m_k$ binary waveforms on lines 210–230, each separated by a code bit interval, to generate $M^2$-PR2 signals $mp_k$ on lines 240 representative of the polynomial $0.5(1+D)^2$. The code bit intervals are generated by delay elements 215 (shown at $m_{k-1}$) and 225 (shown at $m_{k-2}$), and a summing circuit 235 combines these weighted signals. Noise $n_k$ on line 250 is then added to the $mp_k$ signals to produce channel output signals $y_k$ on line 115.

Figure 3:
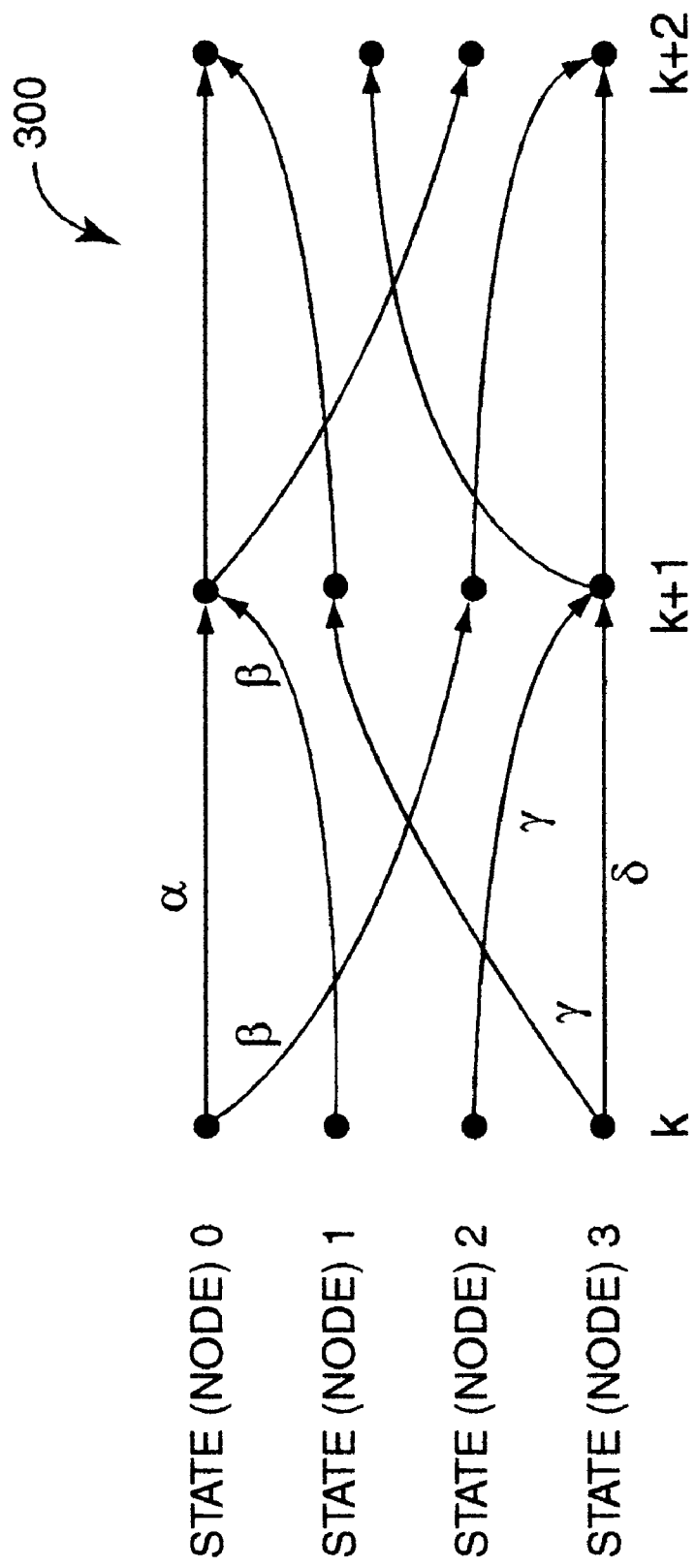
FIG. 3 depicts a four-state trellis diagram for modeling the channel filter of FIG. 2.

Since the output of each delay element may assume one of two states, i.e., +1 or −1, the $M^2$-PR2 equivalent channel can be modeled by 10 a four-state trellis diagram 300 depicted in FIG. 3. Here, the four states (nodes) 0–3 exist at discrete time dimensions k, k+1 and k+2. Single-headed arrow segments indicate allowable state transitions within the channel 110.

It should be noted that the trellis 300 is generally derived from a is trellis of the filter of FIG. 2, this latter trellis being modified by deleting branches leading to state transitions that violate the $M^2$ coding constraint For example, the code bit streams "010" and "101" violate the minimum $M^2$ runlength constraint as indicated by the lack of arrows representing state transitions from node 2 to node 1 ("010") and from node 1 to node 2 ("101").

Specifically, each arrow represents a state transition labeled with a unique branch metric: α, β, γ or δ. For example, the state transition from node 0 at time k to node 0 at time k+1 is labeled branch metric α. The following Table 1 provides a list of allowable state transitions along with their corresponding branch metrics:

TABLE 1

| From State | | To State | Branch Metric |
|---|---|---|---|
| 0 | → | 0 | $\alpha = 2z_k + 18$ |
| 1 | → | 0 | $\beta = z_k$ |
| 3 | → | 1 | $\gamma = -z_k$ |
| 0 | → | 2 | $\beta = z_k$ |
| 2 | → | 3 | $\gamma = -z_k$ |
| 3 | → | 3 | $\delta = -2z_k + 18$ |

A branch metric represents the Euclidean distance (ed) between the actual measured path, i.e., a state transition between branch nodes, is and an allowable state transition as indicated by a current data sample $z_k$. The metrics α, β, γ and δ preferably comprise 8-bit values computed from a sample $z_k$ and processed by the Viterbi detector 400.

Referring again to the trellis of FIG. 3, each state transition illustrates its associated branch metric. There are two possible state transitions to node 0 at time k+1, e.g., α and β, and two transitions to node 3 at time k+1, e.g., γ and δ. The Viterbi detector ascertains the most likely path leading into each of these nodes by choosing the path with the smallest branch metric, i.e., the transition having the smallest distance.

As noted, a cumulative path metric is the sum of the branch metrics for a particular path to the left of a node under consideration. Table 2 shows the cumulative path metrics of state transitions for each of the 4 nodes at times k, k+1 and k+2.

TABLE 2

| To State | Surv. Cum. Metric $\Gamma_{0-3,k+1}$ | Comment |
|---|---|---|
| 0 | $\Gamma_{0,k+1}$ = smaller of $\Gamma_{0,k} + \alpha$ | From State = 0 |
| | $\Gamma_{1,k} + \beta$ | From State = 1 |
| 1 | $\Gamma_{1,k+1} = \Gamma_{3,k} + \gamma$ | From State = 3 |
| 2 | $\Gamma_{2,k+1} = \Gamma_{0,k} + \beta$ | From State = 0 |
| 3 | $\Gamma_{3,k+1}$ = smaller of $\Gamma_{2,k} + \gamma$ | From State = 2 |
| | $\Gamma_{3,k} + \delta$ | From State = 3 |

Note that there are two possible paths leading to nodes 0 and two is possible paths leading to nodes 3. The cumulative metric calculations choose the paths with the smaller cumulative metric; these paths are known as the "surviving" path metrics. The overall path, i.e., the transition path between the beginning and the end of the trellis having the maximum path metric, is the maximum likelihood path and this latter path represents the best estimate of the code symbols actually transmitted.

Figure 4:
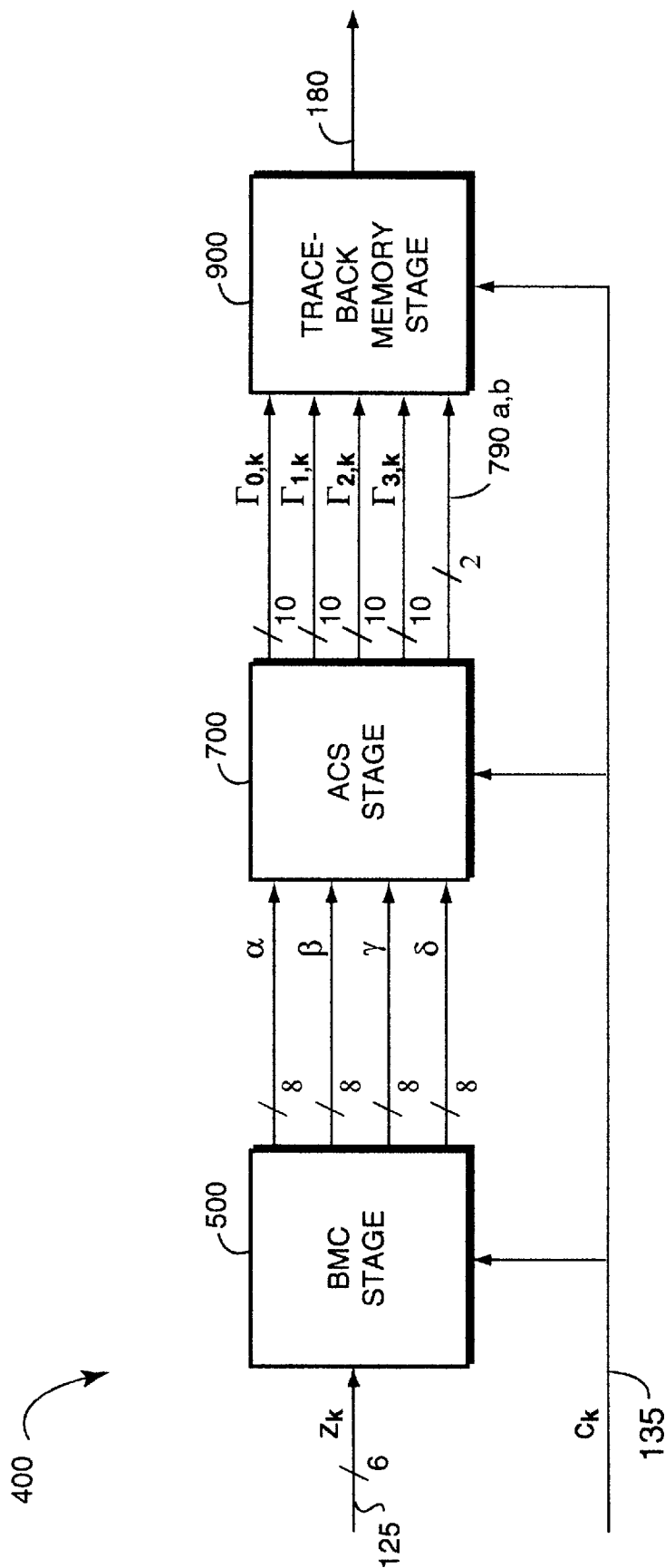
FIG. 4 is a block diagram of a Viterbi detector having a plurality of circuit stages in accordance with the invention.

FIG. 4 illustrates the Viterbi detector 400 including a plurality of circuit stages that are synchronously clocked by clock pulses $c_k$ on line 135 to control the operations of the circuits within each stage. Broadly stated, a branch metric calculation (BMC) stage 500 computes appropriate branch metrics upon reception of a data sample $z_k$ on lines 125. The branch metrics α, β, γ and δ are provided to an add-compare-select (ACS) stage 700 which maintains a cumulative metric Γ for each state. The ACS stage also updates the cumulative metrics of current trellis path "survivors", as described further herein, and chooses new survivors in accordance with these updated cumulative metrics.

Upon receipt of new branch metrics derived from a next sample $z_{k+1}$, the ACS stage forwards, inter alia, the four currently-updated s cumulative metrics $\Gamma_{0,k}$–$\Gamma_{3,k}$ to a trace-back memory stage 900. There, information (including the state with the minimum branch metric) relating to the previous sixteen (16) $z_k$ samples is maintained. From this information, trace-back memory stage 900 produces the most likely estimate of the $M^2$ signal and provides this signal at the output of the detector on line 180.

Figure 5:
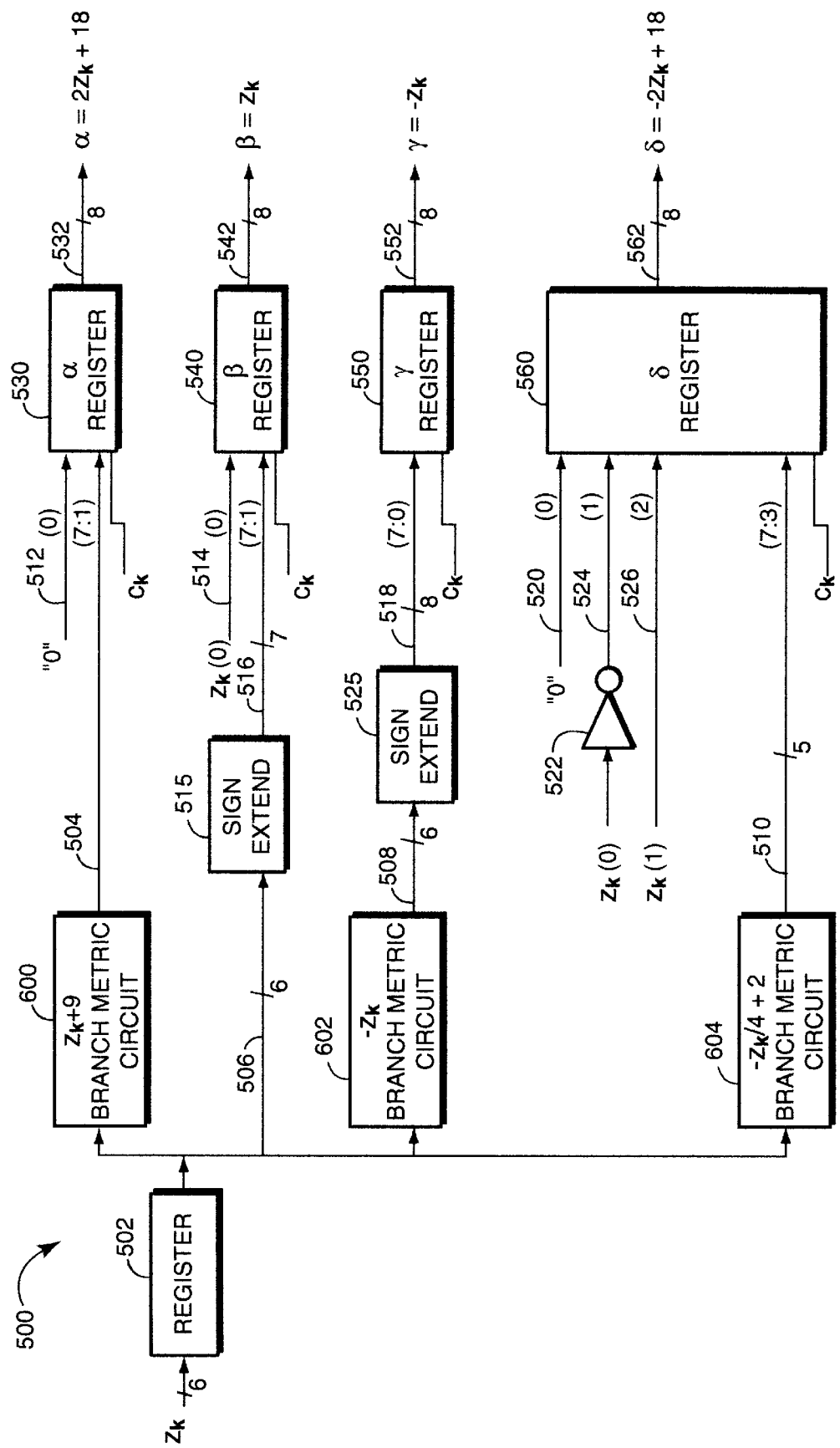
FIG. 5 is a schematic block diagram of a branch metric calculation (BMC) stage of the Viterbi detector of FIG. 4.

A schematic block diagram of the BMC stage 500 is shown in FIG. 5. The BMC stage 500 comprises a plurality of combinatorial logic circuits coupled to various registers for calculating the branch metrics α, β, γ and δ from a received sample $z_k$. As noted, the equation for these metrics are listed in Table 1 above and are implemented by the circuits of BMC stage 500.

In FIG. 5, an incoming 6-bit sample $z_k$ on lines 125 is stored in a 6-bit register 502 prior to distribution to branch metric logic circuits 600, 602 and 604. Branch metric logic circuit 600 is configured to generate a 7-bit equation $z_k+9$ that is stored in a register 530 as input bits <7:1> via lines 504. Bit 0 on line 512 of register 530 is tied to logical "0", which functions to shift the output signals on lines 504 by 1-bit, thereby multiplying the result of circuit 600 by 2. Since logic circuit 600 generates the branch metric quantity $z_k+9$ at its output, the effect of this shifting operation is to produce an 8-bit quantity $\alpha=2Z_k+18$ at the output of register 530 on lines 532.

Registers 540 and 550 store the 8-bit branch metrics β and γ. Specifically, input bit 0 to β register 540 on line 514 is bit 0 of sample $z_k$; however, since the sample $z_k$ stored in register 502 is only 6-bits, the value of that sample must be sign extended by circuit 515 to 7-bits. Sign extension simply replicates the highest-order output bit of register 502, i.e., bit 5, to input bit 7 of register 540, thus generating input bits <7:1> on lines 516; accordingly, the output of register 540 on lines 542 is $\beta=z_k$. Similarly, branch metric logic circuit 602 is configured to generate a 6-bit value $-z_k$ on lines 508 that is sign extended to input bits <7:0> by circuit 525 prior to storage in γ register 550. The output of register 550 is the branch metric $\gamma=-z_k$ on lines 552.

Branch metric logic circuit 604 is configured to generate a 5-bit quantity $-z_k/4+2$ that is provided to δ register 560 via lines 510. The input signals on lines 510 are shifted 3-bits, i.e., to input bits <7:3>, thereby multiplying the output of circuit 604 by 8. Bit 0 on line 520 of register 560 is tied to logical "0" and bit 2 on line 526 is bit 1 of $z_k$, while bit 1 is inverted bit 0 of $z_k$ on line 524, this latter signal being generated by an inverter circuit 522. As a result of these operations, the output of register 560 on lines 562 is the quantity $\delta=-2z_k+18$.

Figure 6:
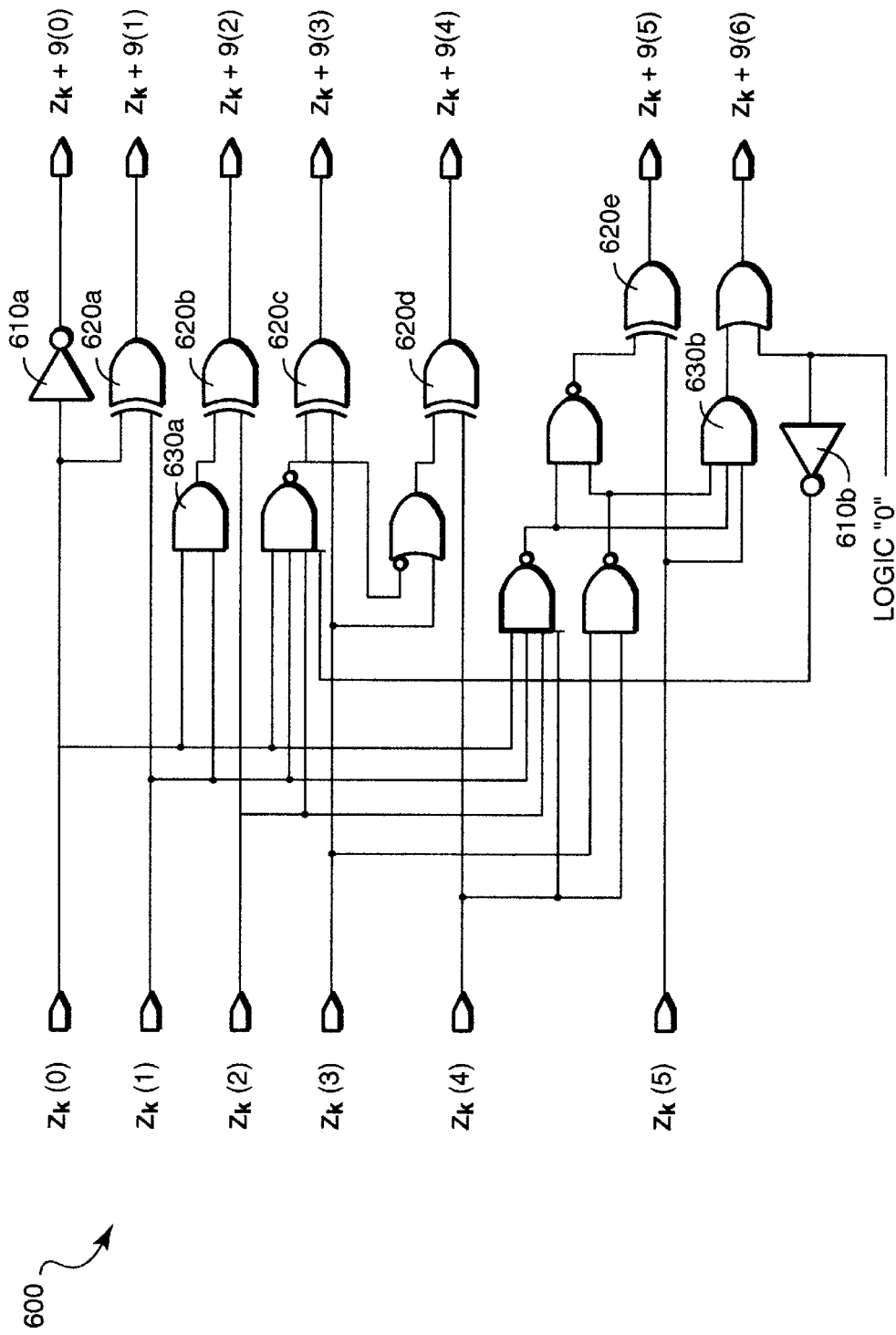
FIG. 6 is a schematic diagram of an illustrative embodiment of a branch metric logic circuit of the BMC stage shown in FIG. 5.

FIG. 6 is a schematic diagram of an illustrative embodiment of the branch metric logic circuit 600. Bits $z_k$<5:0> represent the 6-bit input sample $z_k$ delivered by the register 502 to circuit 600, which preferably comprises a plurality of logic gates (e.g., inverter circuits 610, exclusive OR gates 620 and AND gates 630) arranged and configured to generate the 7-bit quantity $z_k+9$ at its output on lines 504 as bits $z_k+9<7:1>$. Table 3 sets forth portions of the truth table for implementing the branch metric circuit of FIG. 6.

TABLE 3

| Input: $Z_k$ | | | | | | | Output: $Z_k + 9$ | | | | | | |
|---|---|---|---|---|---|---|---|---|---|---|---|---|---|
| <5> | <4> | <3> | <2> | <1> | <0> | Dec | <7> | <6> | <5> | <4> | <3> | <2> | <1> | Dec |
| 0 | 0 | 0 | 0 | 0 | 0 | 0 | 0 | 0 | 0 | 1 | 0 | 0 | 1 | 9 |
| 0 | 0 | 0 | 0 | 0 | 1 | 1 | 0 | 0 | 0 | 1 | 0 | 1 | 0 | 10 |
| 0 | 0 | 0 | 0 | 1 | 0 | 2 | 0 | 0 | 0 | 1 | 0 | 1 | 1 | 11 |
| 0 | 0 | 0 | 0 | 1 | 1 | 3 | 0 | 0 | 0 | 1 | 1 | 0 | 0 | 12 |
| 0 | 0 | 0 | 1 | 0 | 0 | 4 | 0 | 0 | 0 | 1 | 1 | 0 | 1 | 13 |
| 0 | 0 | 0 | 1 | 0 | 1 | 5 | 0 | 0 | 0 | 1 | 1 | 1 | 0 | 14 |
| 0 | 0 | 0 | 1 | 1 | 0 | 6 | 0 | 0 | 0 | 1 | 1 | 1 | 1 | 15 |
| 0 | 0 | 0 | 1 | 1 | 1 | 7 | 0 | 0 | 1 | 0 | 0 | 0 | 0 | 16 |
| 0 | 0 | 1 | 0 | 0 | 0 | 8 | 0 | 0 | 1 | 0 | 0 | 0 | 1 | 17 |
| 0 | 0 | 1 | 0 | 0 | 1 | 9 | 0 | 0 | 1 | 0 | 0 | 1 | 0 | 18 |
| 0 | 0 | 1 | 0 | 1 | 0 | 10 | 0 | 0 | 1 | 0 | 0 | 1 | 1 | 19 |
| 0 | 0 | 1 | 0 | 1 | 1 | 11 | 0 | 0 | 1 | 0 | 1 | 0 | 0 | 20 |
| 0 | 0 | 1 | 1 | 0 | 0 | 12 | 0 | 0 | 1 | 0 | 1 | 0 | 1 | 21 |
| 0 | 0 | 1 | 1 | 0 | 1 | 13 | 0 | 0 | 1 | 0 | 1 | 1 | 0 | 22 |

It will be understood to those skilled in the art that the contents of the truth table can be used to implement equivalent logic circuits of the branch metric logic circuit 600. Similarly, those skilled in the art can use the equations of Table 1 to construct truth tables for implementing equivalent logic circuits for the remaining branch metric logic circuits 602 and 604.

Figure 7:
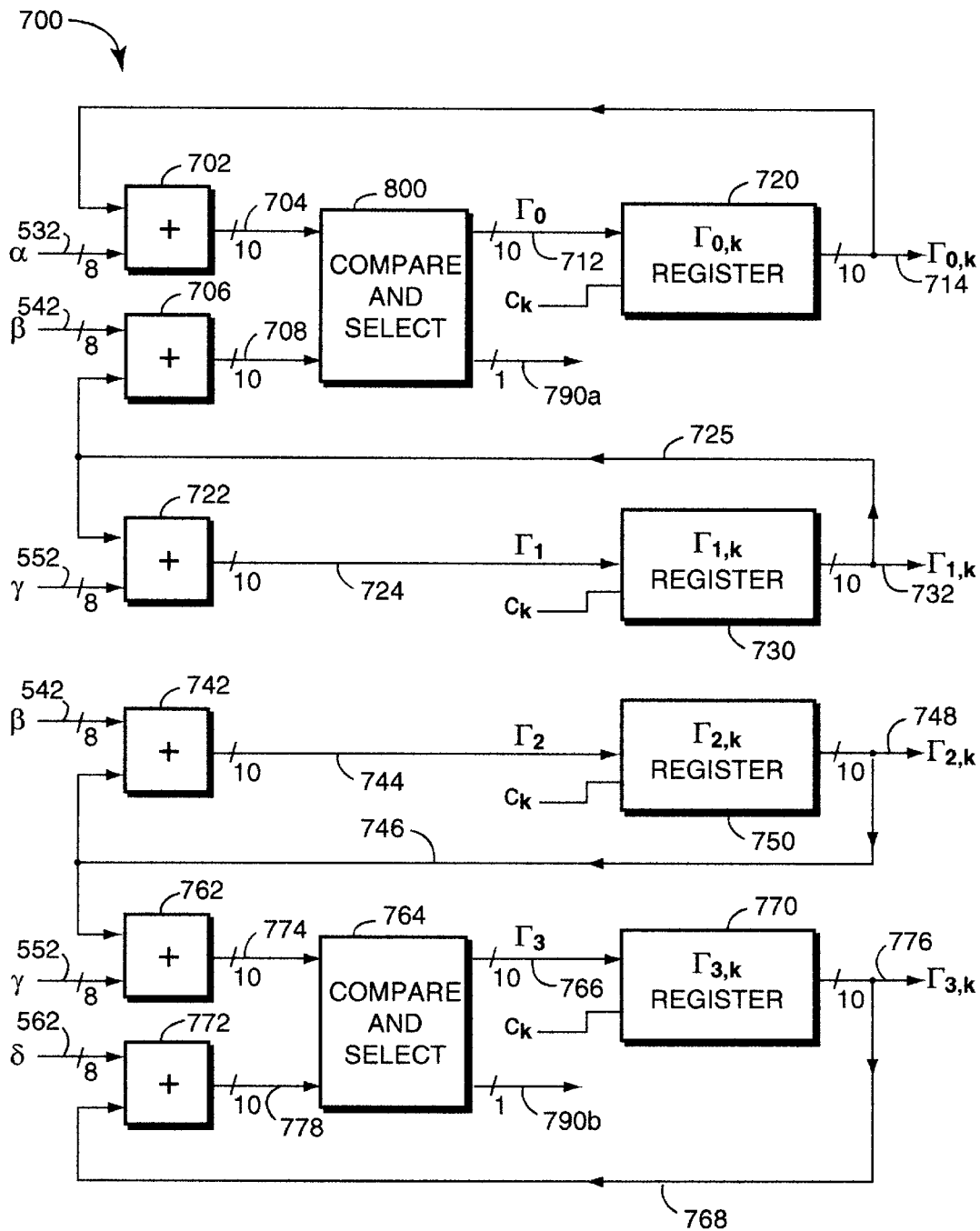
FIG. 7 is a schematic block diagram of an add-select-compare (ACS) stage of the Viterbi detector of FIG. 4.

FIG. 7 is a schematic block diagram of the ACS stage 700 which operates to implement the cumulative metric calculations shown in Table 2. Specifically, the ACS stage analyzes the cumulative metrics for each state and, in the case of transitions to nodes 0 or to nodes 3, the ACS circuits select the surviving path. As an example and referring to Table 2 for transitions to state 0, the cumulative metric $\Gamma$ is the smaller of the previous cumulative metric for state 0 at time k, i.e., $\Gamma_{0,k}$, $+\alpha$ or the previous cumulative metric for state 1 at time k, i.e., $\Gamma_{1,k}$, $+\beta$. Referring to FIG. 7, the registers 720 and 730 store these cumulative metric $\Gamma_{0,k}$ and $\Gamma_{1,k}$ respectively.

More specifically, the 10-bit output of $\Gamma_{0,k}$ register 720 on lines 716 is combined with branch metric a on lines 532 at adder circuit 702, while the 10-bit output of register $\Gamma_{1,k}$ 730 on lines 725 are added to the branch metric $\beta$ at adder 706. Compare and select logic circuit 800 compares the outputs of adders 702 and 706, and passes the smaller sum as $\Gamma_0$ on lines 712 as input signals to register 720, where the signals are stored as an updated value on the next clock pulse $c_k$. The output of register 720 on lines 714 then becomes the new cumulative metric $\Gamma_{0,k}$, while the output of compare and select logic circuit 800 on line 790a is provided to the trace-back memory stage 900 as an indication of which branch metric input to the circuit 800 is the smaller.

Similarly, $\Gamma_{3,k}$ register 770 stores the previous cumulative metric for state 3. Here, the 10-bit output of register 770 on lines 768 is combined with branch metric $\delta$ on lines 562 at adder circuit 772, while the 10-bit output of $\Gamma_{2,k}$ register 750 on lines 746 are added to the branch metric $\gamma$ at adder 762. Compare and select logic circuit 764 compares the outputs of adders 772 and 762, and passes the smaller sum as $\Gamma_3$ on lines 766 to register 770 and onto its output lines 776 as new cumulative metric $\Gamma_{3,k}$ on the next clock pulse $c_k$. The circuit 764 also provides an indication of which of its input branch metric signals are the smaller to the trace-back memory stage 900 on line 790b.

On the other hand, as shown in Table 3, transitions to state 1 and state 2 have only one possible predecessor and so no comparison and selection operation is required.

Accordingly, adder circuits 722 and 742 simply add the outputs of their respective registers 730 and 750 (shown at lines 725 and 746) to branch metrics $\gamma$ and $\beta$, respectively, to generate previous cumulative metrics $\Gamma_1$ on lines 724 and $\Gamma_2$ on lines 744 for storage in registers 730 and 750, respectively. The outputs of these registers on lines 732 and 748 then become the new cumulative metrics $\Gamma_{1,k}$ and $\Gamma_{2,k}$.

Figure 8:
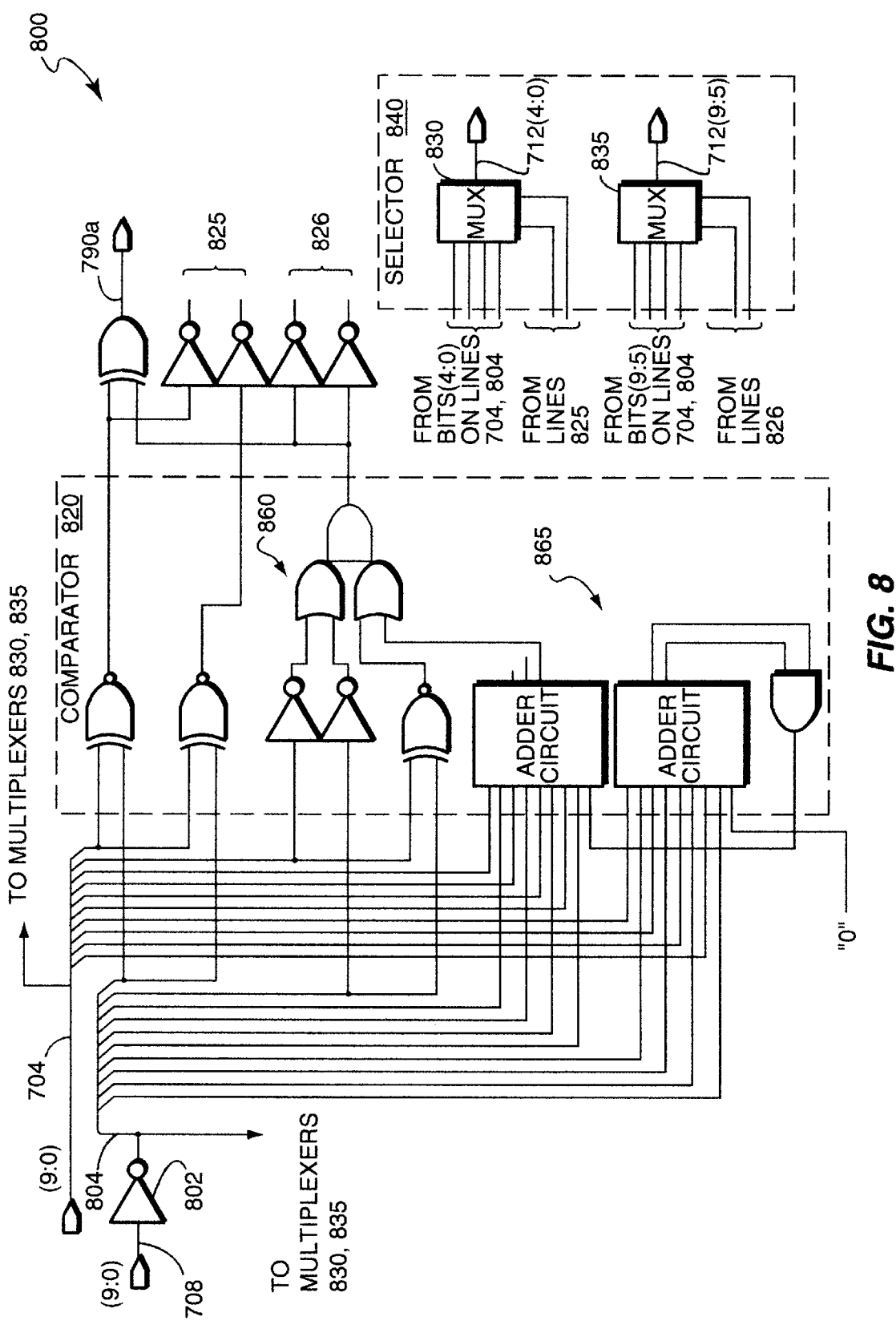
FIG. 8 is a schematic diagram of an illustrative embodiment of a compare and select logic circuit of the ACS stage shown in FIG. 7.

FIG. 8 is a circuit schematic diagram of an illustrative embodiment of the compare and select logic circuit 800. One input to the circuit 800 is a 10-bit signal on lines 704 from the adder 702; the other input on lines 804 is an inverted version of the 10-bit signal on lines 708 from adder 706 with the inversion operation being provided by inverter circuit 802. Since a two's complement number is negated by inverting each bit then incrementing the result by one, the inverted signal on lines 804 represents the negative of the number represented on lines 708 minus one.

A comparator circuit 820 comprises an upper combinatorial logic circuit section 860 and a lower section 865 of adder circuits that together compute the two's complement difference between the numbers represented by the signal on lines 704 and 708. The comparator 820 uses the sign of the computed difference to generate a signal 790a indicating the lower of the two input signals on lines 704 and 804, together with signals 825 and 826 for controlling multiplexers 830 and 835 of a selector circuit 840. Each multiplexer receives 5-bits from each of the input signals and delivers the smaller of those input signals at its output, e.g., on lines 712 <4:0> for multiplexer 830 and on lines 712 <9:5> for multiplexer 835, in response to the signals on lines 825 and 826.

Operationally, a branch metric is added to a cumulative metric each time a code bit is processed, so the cumulative metric could overflow. Cumulative metrics must be maintained within a prescribed range in order to compare pairs of cumulative metrics. One solution is to periodically subract a large constant from each cumulative metric to "normalize" it. However, the preferred embodiment employs sufficient bits to represent a cumulative metric so that the maximum difference between any two metrics is less than half the largest number that can be represented by the same number of bits. This allows cumulative metrics to overflow, yet comparator 820 can ascertain which of two cumulative metrics is smaller by subtracting in accordance with two's complement notation one metric from the other and observing the sign bit of the difference. This method is well known in the art, as indicated by C. B. Shung, et. al., in *VLSI Architectures for Metric Normalization in the Viterbi Algorithm,* Proc. 1990 IEEE Int. Conf. Comm. Through simulations, it has been found that the maximum difference between pairs of cumulative metrics produced by the equations shown in Table 1 is approximately 245; consequently, the preferred embodiment employs ten bits to represent the cumulative metrics shown in Table 2.

Figure 9:
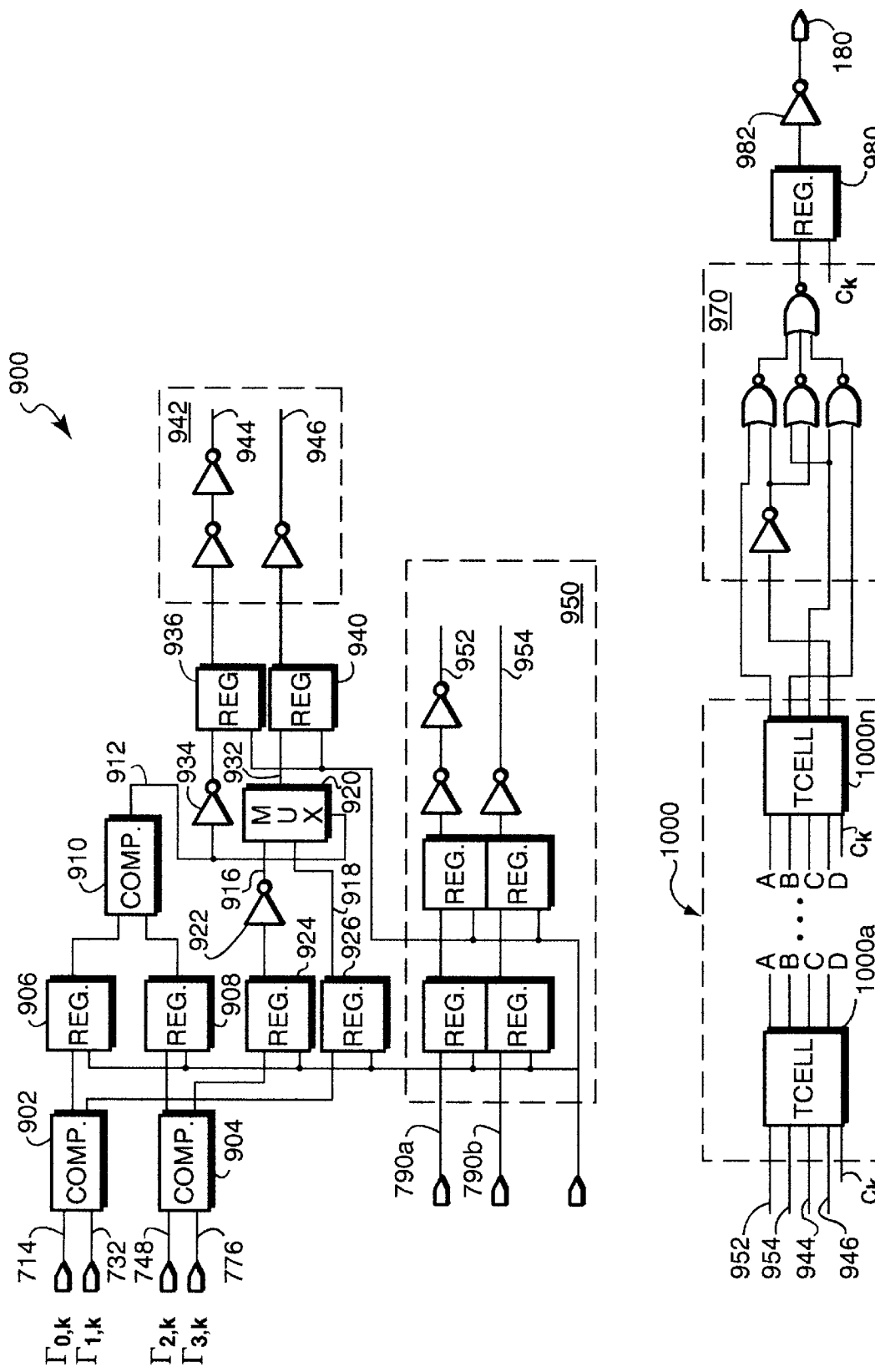
FIG. 9 is a schematic diagram of a trace-back memory stage of the Viterbi detector of FIG. 4.

FIG. 9 is a schematic diagram of the trace-back memory stage 900 which receives as inputs the four cumulative metrics $\Gamma_{0,k}$–$\Gamma_{3,k}$. For this stage of the detector, comparator circuit 902 determines the smaller of the cumulative metric for state 0, i.e., $\Gamma_{0,k}$ on lines 714, and the cumulative metric for state 1, i.e., $\Gamma_{1,k}$ on lines 732, and passes that smaller result onto register 906. Similarly, comparator 904 determines the smaller of the cumulative metrics for state 2 ($\Gamma_{2,k}$ on lines 748) and state 3 ($\Gamma_{3,k}$ on lines 776), and passes its result on to register 908. From there, comparator 910 compares the outputs of registers 906 and 908 and determines which of the four cumulative metrics is the smallest. The result of this operation is provided on line 912 as an enable signal for a multiplexer 920.

The multiplexer 920 selects one of two signals 916 or 918 received at its input from registers 924 and 926, respectively. These registers store output signals from comparators 904 and 902, respectively, which signals provide an indication of the smaller of the cumulative metric inputs to those comparators. Thus, the combination of signal 912 and the output signal of multiplexer 920 on line 932 uniquely identify which of the four cumulative metrics is the smallest.

The signal on line 912 is inverted by inverter circuit 934 prior to storage in register 936, while the signal on line 932 is stored in register 940. After the next clock pulse $c_k$, the outputs of registers 936 and 940 are applied to circuit 942 and the output of this latter circuit feeds the input of a first of 16 tcell circuits 1000*a–n*.

Figure 10:
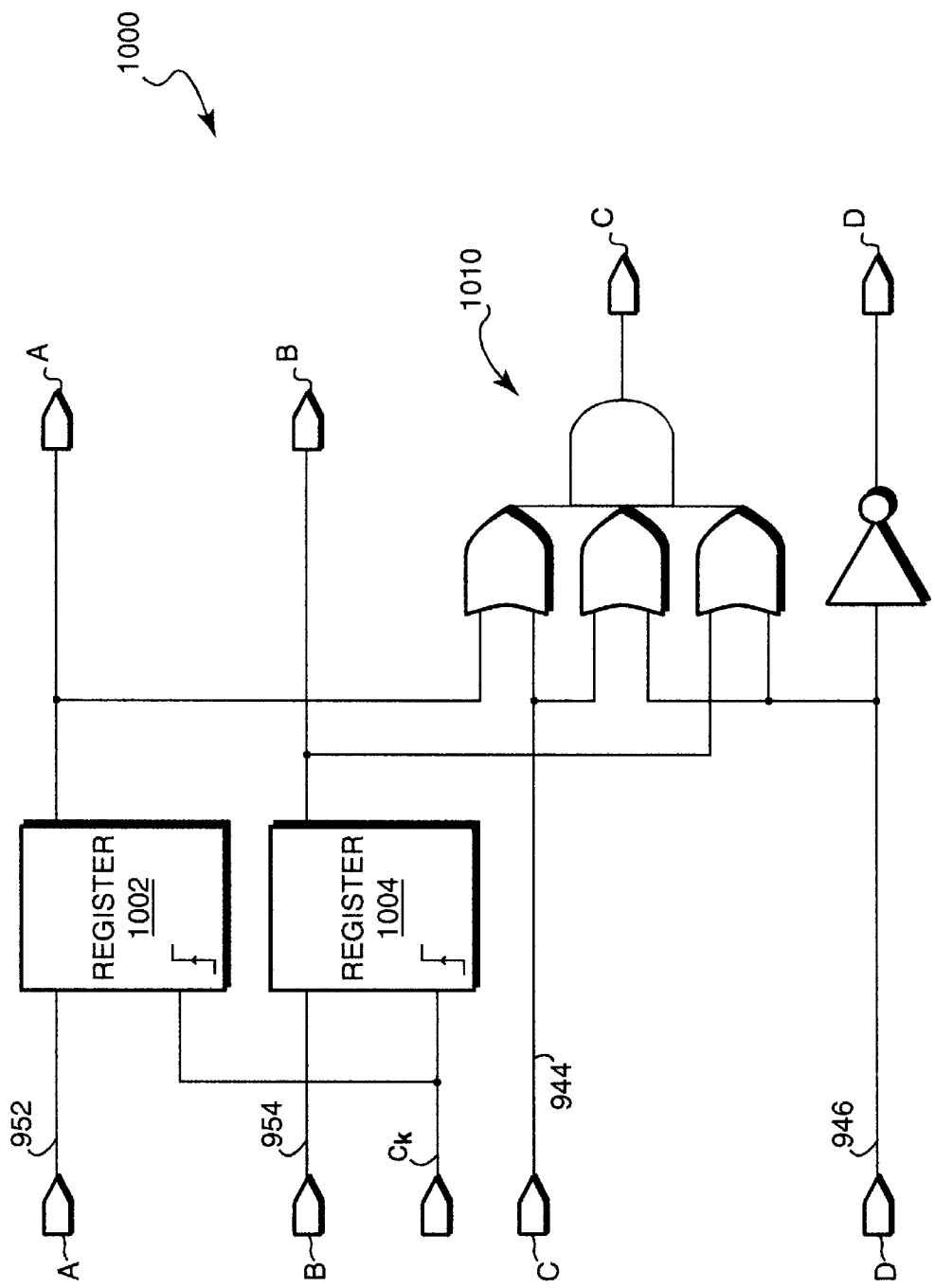
FIG. 10 is a schematic of an illustrative tcell circuit of the trace-back memory stage shown in FIG. 9.

FIG. 10 is a schematic of an illustrative tcell circuit 1000 comprising a pair of registers 1002 and 1004 whose outputs are coupled to a combinatorial logic circuit 1010. It should be noted that the inputs to each tcell 1000 comprise four signals on lines 944, 946, 952 and 954. Referring also to FIG. 9, these latter signals on lines 952 and 954 are generated by circuit 950 having as inputs the signals on lines 790*a,b* from the compare and select circuits 800 and 764 of ACS stage 700. Circuit 950 includes a configuration of registers coupled to inverter circuits for passing both delayed and inverted indications of the smallest branch metrics from the ACS stage 700.

The outputs of each tcell 1000 are applied to the inputs of subsequent tcells having circuits equivalent circuits to those of FIG. 10. In the illustrative embodiment, there are preferably 16 tcells arranged in a cascaded fashion. The outputs of the 16th tcell 1000*n* are applied as inputs to combinatorial logic circuit 970 and the output of this latter circuit is fed to register 980. The output of register 980 is inverted by inverter 982, whose output signal on line 984 is the most-likely $M^2$ output bit.

In summary, the combination of $M^2$ encoded signals equalized with PR2 signaling provides a uniquely conditioned set of signals upon which maximum-likelihood detection may be efficiently realized using the synchronized circuit arrangement of the invention. In addition, the novel Viterbi detector configuration improves the random error rate of received PR2-equalized $M^2$ signals by approximately two orders of magnitude relative to known threshold detectors.

While there has been shown and described a preferred embodiment for implementing a Viterbi detector for $M^2$ encoded signals using PR2 equalization, it is to be understood that various other adaptations and modifications may be made within the spirit and scope of the present invention. For example, the equations of Tables 1 and 3 illustrated herein may be used to construct truth tables (similar to that shown in Table 2) for the purposes of implementing various modifications of the logic circuits comprising the stages of the Viterbi detector. It will therefore be apparent to those skilled in the art that these various changes and modifications in the specifically described embodiments can be carried out without departing from the scope of the present invention which is to be limited only by the scope of the appended claims.

What is claimed is:

1. An arrangement for decoding Miller-squared encoded signals represented by a sequence of digital samples, said encoded signals being transmitted through an information channel having no response at zero frequency, said arrangement comprising:

means for equalizing said transmitted Miller-squared encoded signals at said information channel using partial response signaling; and a Viterbi detector, coupled to said equalizing means, and comprising a plurality of stages synchronously clocked to control operations of circuits within each of said stages, for processing said equalized Miller-squared encoded signals to estimate a maximum-likelihood sequence of encoded signals transmitted through said information channel.

2. The novel arrangement of claim 1 wherein said partial response signaling is Class II partial response signaling.

3. The novel circuit arrangement of claim 1 wherein one of said plurality of stages comprises a branch metric calculation stage for computing branch metrics of a current digital sample upon reception of a next digital sample.

4. The novel circuit arrangement of claim 3 wherein another of said plurality of stages comprises an add-compare-select stage for updating cumulative metrics in response to said computed branch metrics and for choosing survivor metrics in response to said updated cumulative metrics.

5. The novel circuit arrangement of claim 4 wherein yet another of said plurality of stages comprises a trace-back memory stage for storing said survivor metrics and estimating said maximum-likelihood sequence of encoded signals transmitted through said information channel.

6. A method for estimating a maximum-likelihood sequence of Miller-squared coded signals represented by a sequence of digital samples transmitted through an information channel having no response at zero frequency, said method comprising the steps of:

equalizing said transmitted Miller-squared coded signals using Class II partial response signaling; and processing, within a Viterbi detector comprising a plurality of stages which are synchronously clocked, said equalized Miller-squared encoded signals to estimate said maximum-likelihood sequence of Miller-squared coded signals transmitted through said information channel.

7. The method of claim 6 wherein said step of processing further comprises the step of computing branch metrics of a current digital sample upon reception of a next digital sample.

8. The method of claim 7 wherein said step of processing further comprises the steps of:

updating cumulative metrics in response to said step of computing said branch metrics; and choosing survivor metrics in response to said step of updating said cumulative metrics.

9. The method of claim 8 wherein said step of processing further comprises the steps of:

storing said survivor metrics; and estimating said maximum-likelihood sequence of encoded signals transmitted through said information channel.

10. An arrangement for decoding Miller-squared encoded signals represented by a sequence of digital samples, said encoded signals being transmitted through an information channel having no response at zero frequency, said arrangement comprising:

means for equalizing said transmitted Miller-squared encoded signals at said information channel using partial response signaling; and a Viterbi detector, coupled to said equalizing means, and comprising a plurality of stages synchronously clocked to control operations of circuits within each of said stages, for processing said equalized Miller-squared encoded signals to estimate a maximum-likelihood sequence of encoded signals transmitted through said information channel, wherein said plurality of stages includes a branch metric calculation stage for computing branch metrics of a current digital sample upon reception of a next digital sample.

11. The novel arrangement of claim 10 wherein said partial response signaling is Class II partial response signaling.

12. The novel circuit arrangement of claim 11 wherein another of said plurality of stages comprises an add-compare-select stage for updating cumulative metrics in response to said computed branch metrics and for choosing survivor metrics in response to said updated cumulative metrics.

13. The novel circuit arrangement of claim 12 wherein yet another of said plurality of stages comprises a trace-back memory stage for storing said survivor metrics and estimating said maximum-likelihood sequence of encoded signals transmitted through said information channel.

* * * * *